United States Patent [19]
Evans

[11] 3,987,606
[45] Oct. 26, 1976

[54] GRASS CLIPPING COLLECTION APPARATUS

[75] Inventor: Lee D. Evans, Elm Grove, Wis.

[73] Assignee: Outboard Marine Corporation, Waukegan, Ill.

[22] Filed: Jan. 10, 1974

[21] Appl. No.: 432,286

[52] U.S. Cl. .............................. 56/13.4; 56/13.3; 56/202; 56/320.2
[51] Int. Cl.² ..................................... A01D 35/26
[58] Field of Search ......... 56/320.2, 202, 16.4–16.6, 56/13.3, 13.4, 13.1

[56] References Cited
UNITED STATES PATENTS

| | | | |
|---|---|---|---|
| 2,990,666 | 7/1961 | Blume | 56/13.4 |
| 3,588,179 | 6/1971 | Gifford | 56/13.3 X |
| 3,624,989 | 12/1971 | Gatheridge | 56/202 |
| 3,708,968 | 1/1973 | Enters et al | 56/320.2 X |

FOREIGN PATENTS OR APPLICATIONS
159,531  10/1954  Australia ............................. 56/13.3

Primary Examiner—J.N. Eskovitz
Attorney, Agent, or Firm—Michael, Best & Friedrich

[57] ABSTRACT

Disclosed herein is a grass clipping apparatus for a rotary lawn mower, which apparatus comprises a cylindrical housing having an open lower end, means for supporting the housing with the axis of the housing extending generally vertically, a grass clipping passage or duct extending tangentially from the housing for delivering grass clippings from the lawn mower to the housing for initial centrifugal action or swirling movement of the clippings in the housing, which action or movement is effective to throw the clippings toward the outer wall of the housing, and a receptacle, preferably a disposable bag, located below the housing for receiving the clippings from the housing.

8 Claims, 9 Drawing Figures

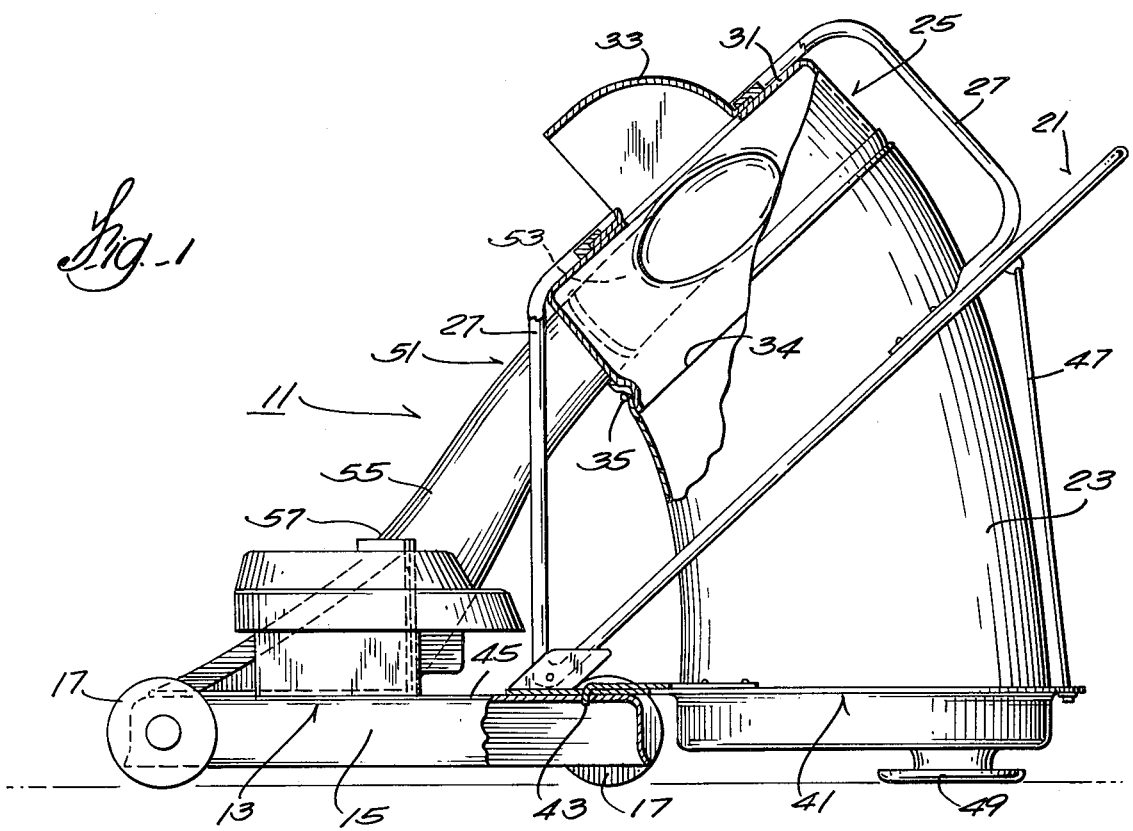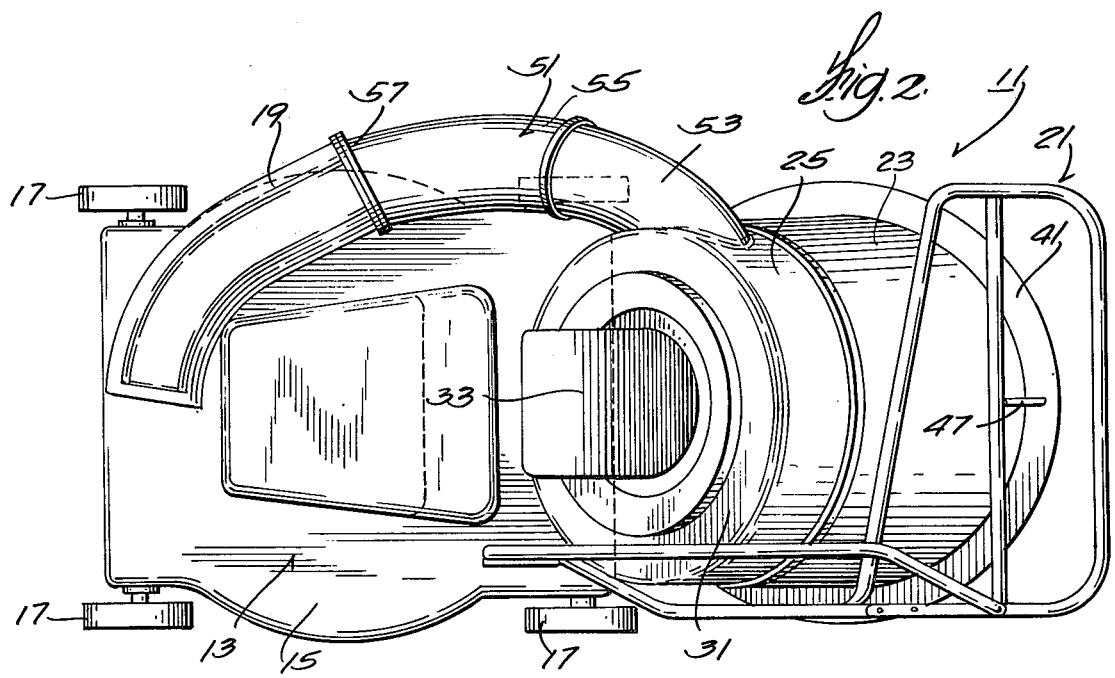

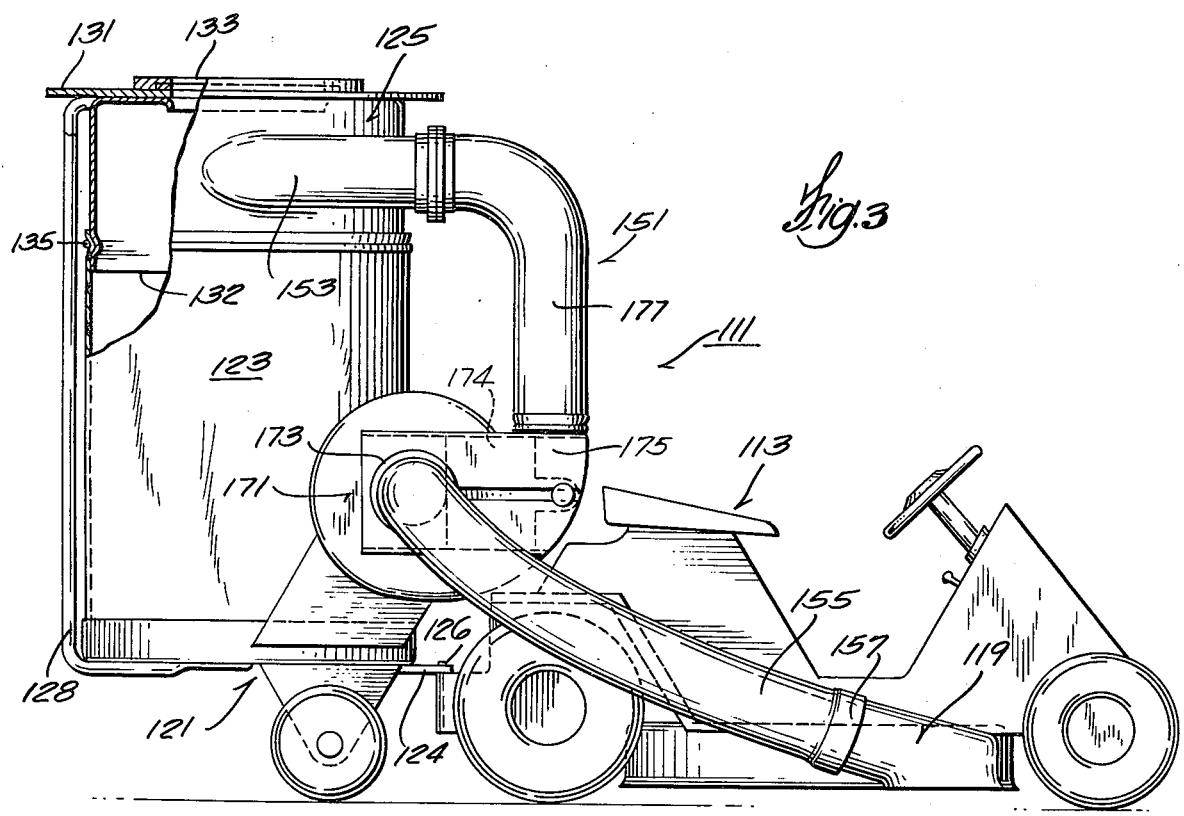
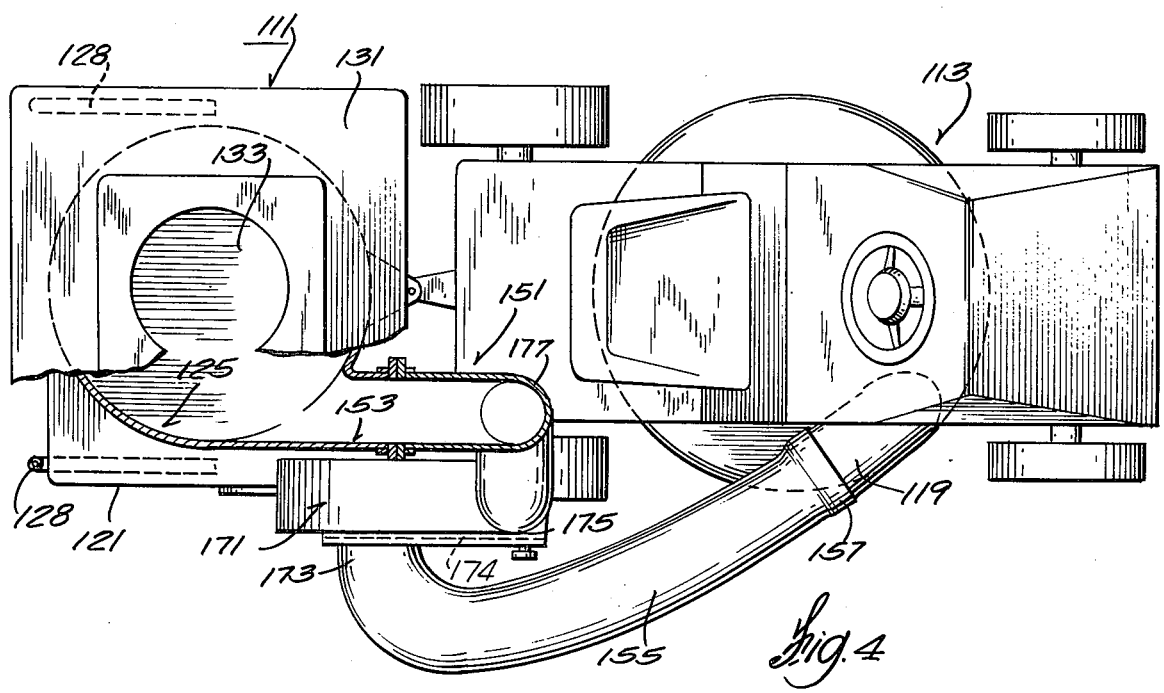

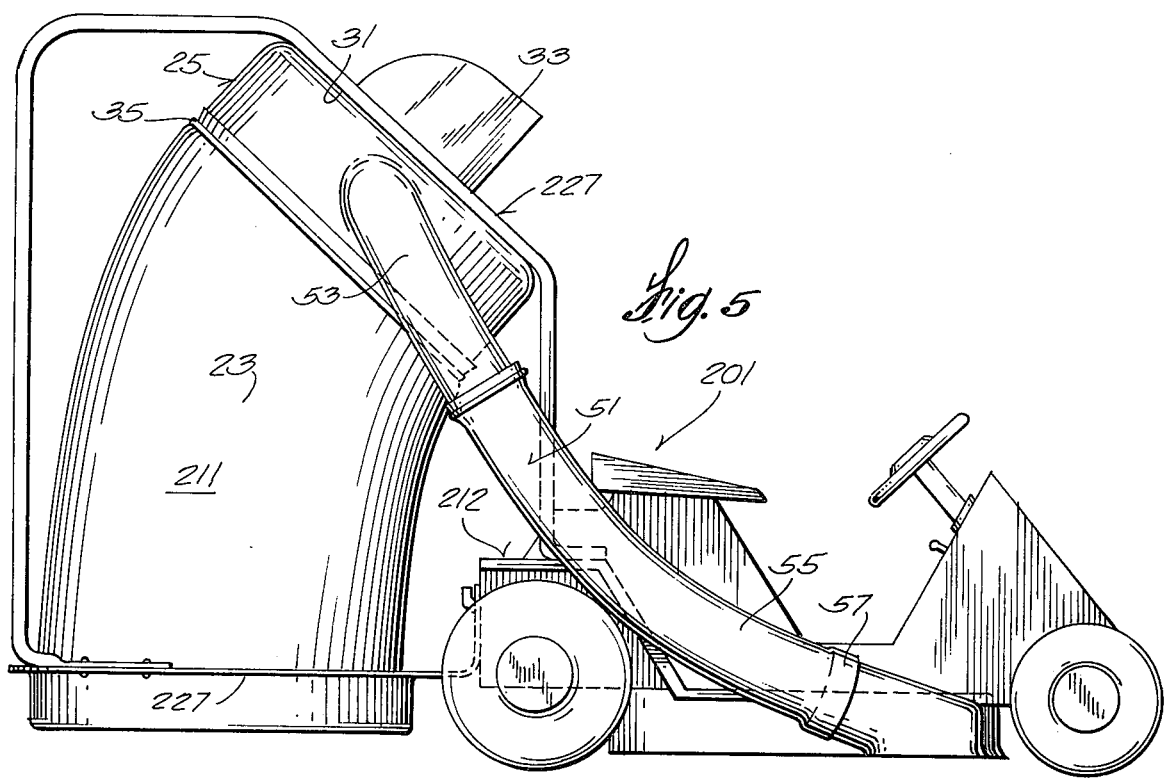
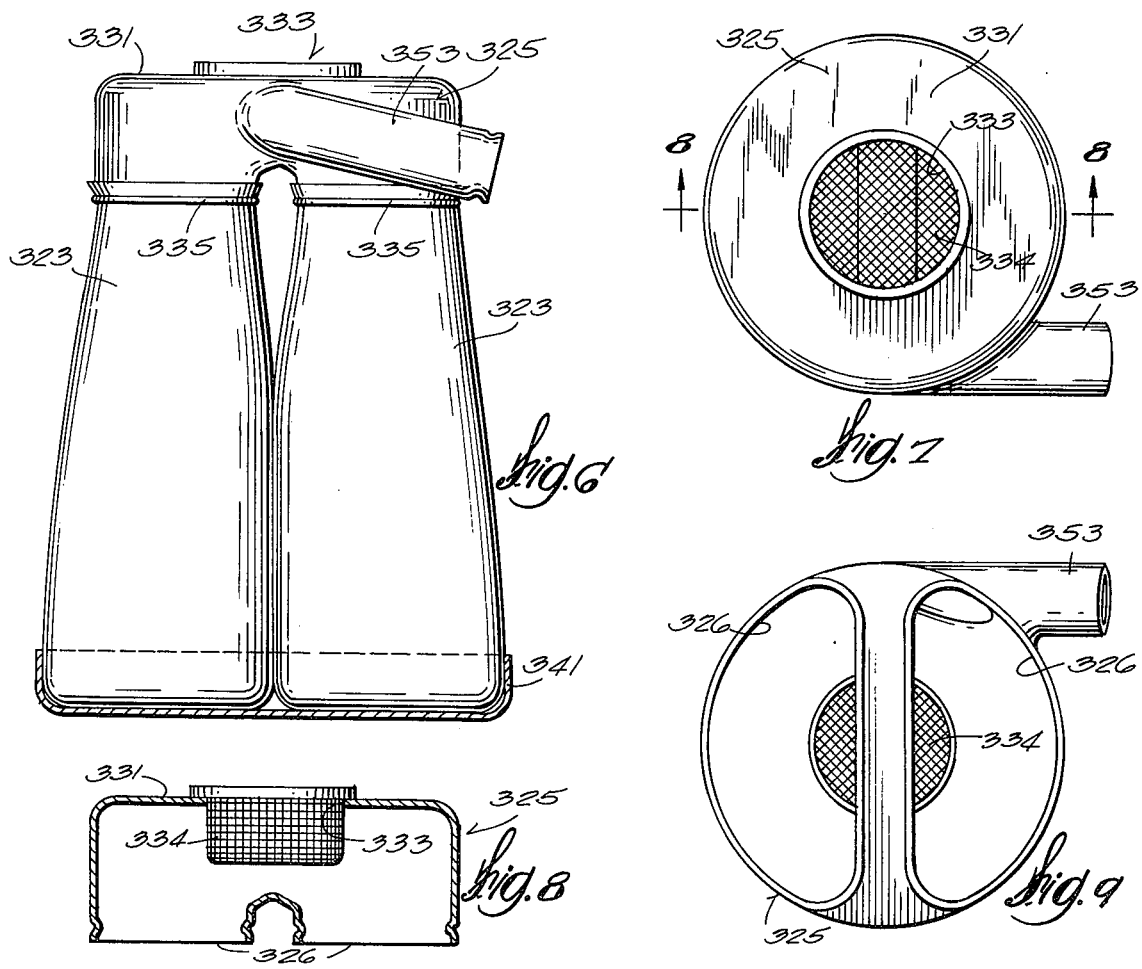

GRASS CLIPPING COLLECTION APPARATUS

BACKGROUND OF THE INVENTION

The invention relates generally to rotary lawn mowers and, more particularly, to grass collection apparatus for rotary lawn mowers. The invention also relates to grass collecting apparatus including disposable bags of plastic or other generally air impervious materials.

The invention is applicable both to riding or rotary lawn mowers and to rotary lawn mowers which are guided for movement by a handle extending rearwardly from a blade housing.

One form of rotary lawn mower to which the application is applicable is disclosed in the Shaw U.S. Pat. No. 3,118,267 issued Jan. 21, 1964.

SUMMARY OF THE INVENTION

The invention provides a grass clipping collection apparatus for a rotary lawn mower, which apparatus comprises a cylindrical or tubular housing having an open lower end, means for supporting the housing with the axis of the housing extending generally vertically, a grass clipping passage or duct extending tangentially from the housing for delivering grass clippings from the lawn mower to the housing for initial centrifugal action or swirling movement of the clippings toward the outer wall of the housing, and receptable means located below the housing for receiving grass clippings from the housing. The apparatus also includes a cover closing the upper end of the housing and providing an exiting air outlet which can include a hood rotatable relative to the cylindrical housing.

The receptacle is preferably a disposable bag of a plastic or other air impervious material. The grass clipping duct or passage is constructed to be generally air impervious and can include a blower or other means to assist in delivering grass-clipping-laden air from the rotary blade housing of the mower to the tubular or cylindrical housing of the collecting apparatus, from which tubular or cylindrical housing the grass settles into the receptacle and the air exits through an air outlet in the cover.

In further accordance with the invention, the receptacle or bag can be supported on a platform extending from and supported by the mower or the platform can be wheeled and towed or otherwise propelled in association with the mower. If desired, the tubular housing can, in whole or part, be supported from the handle of the lawn mower.

One of the principal features of the invention is the provision of a grass collection apparatus adapted for use with disposable grass collection bags.

Another of the principal features of the invention is the provision of a grass collecting apparatus which substantially reduces the amount of dirt and dust which is discharged into the air as, for instance, through air porous grass collection bags.

Another of the principal features of the invention is the provision of a grass collecting apparatus which advantageously prevents direct discharge of solid objects capable of injuring the operator or a bystander.

Another of the principal features of the invention is the provision of a grass collecting apparatus which will provide superior and reliable service for a long and useful life.

Another of the principal features of the invention is that there is substantially no increase in air resistance as the collection bag fills with clippings or debris.

Another of the principal features of the invention is that the air resistance of the attachment is considerably less than that of a porous bag type collector since there is free exiting of air from the attachment.

Still another feature of the invention resides in the use of disposable bags, thereby avoiding transfer of the clippings or debris to another container for disposal.

Other features and advantages of the invention will become known by reference to the following drawings, description, and claims.

THE DRAWINGS

FIG. 1 is a side elevational view, partially broken away and in section, of a lawn mower including grass collecting apparatus in accordance with the invention.

FIG. 2 is a top view of the lawn mower shown in FIG. 1.

FIG. 3 is a side elevational view, partially broken away and in section, of another lawn mower including grass collecting apparatus embodying various of the features of the invention.

FIG. 4 is a top view of the lawn mower shown in FIG. 3.

FIG. 5 is a side elevational view of another embodiment of a riding lawn mower which incorporates various of the features of the invention.

FIG. 6 is a side elevational view of another embodiment of the invention employing a housing to which a plurality of collection bags are detachably connected.

FIG. 7 is a top view of the housing shown in FIG. 6.

FIG. 8 is a sectional view taken along line 8—8 of FIG. 7.

FIG. 9 is a bottom view of the housing shown in FIG. 6.

Before explaining the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Shown in FIGS. 1 and 2 is an attachment or apparatus 11 which is adapted for collecting grass clippings and which is adapted to be mounted on or supported by a rotary lawn mower 13 which is of generally conventional construction as disclosed in the Shaw U.S. Pat. No. 3,118,276. Of course, the apparatus or attachment 11 is not limited to lawn mowers of the specific construction shown in the Shaw U.S. Pat. No. 3,118,267.

The lawn mower 13 includes a rotary blade housing 15 supported by a plurality of wheels 17 and including an upwardly and rearwardly extending discharge chute or outlet 19 having a rearwardly facing opening.

Extending upwardly and rearwardly from the blade housing 15 is a handle structure 21 which is designed to accommodate the clipping collection apparatus 11. In this regard, the handle structure 21 extends principally upwardly and rearwardly to one side of the blade housing 15 in order to permit location of the collection apparatus or attachment 11 immediately rearwardly of the rotary blade housing 15 and to afford access to the side of the collection attachment or apparatus 11 for removal or replacement of disposable collection bags 23.

More specifically, the grass collecting apparatus attachment 11 comprises a generally cylindrical or tubular open ended sleeve or housing 25 which is supported from the handle structure 21 in any convenient manner with the axis of the sleeve or housing 25 extending principally vertically. Specifically, the sleeve or housing 25 can be attached to the handle structure 21 by suitable supports or brace members 27 (See FIG. 1).

The upper end of the sleeve or housing 25 is closed by means in the form of a cover 31 including a centrally located air discharge means which, in FIG. 1, is in the form of an exiting air hood 33 which can be rotated relative to the sleeve or cylindrical housing 25 to direct the exiting air in a desired direction, either by angular adjustment of the cover 31 relative to the sleeve or housing 25 or by angular movement of the hood 33 relative to the cover 31.

Preferably, the outlet area of the air discharge means is larger than the inlet still to be described. In addition, it is preferable to place a coarse screen in the air discharge means to prevent clipping discharge when the collection bag (still to be described) is nearly or completely filled.

Removably attached in telescopically outward encircling relation to the otherwise open lower end 34 of the sleeve or cylindrical housing 25 is the mouth of a disposable collection bag 23 which is preferably fabricated of plastic or other air impervious material. Various means can be employed to releasably retain the collection bag 23 in connected relation to the lower end 34 of the sleeve or cylindrical housing 25. In the illustrated construction, a garter spring 35 extends around the upper end of the collection bag 23 to retain the mouth of the bag 23 in outwardly encircling telescopic relation to the lower end 34 of the sleeve or cylindrical housing 25. It is desirable that the garter spring provide a tight seal in order to prevent blowing of grass through any opening at the mouth of the bag.

In order to support the weight of the clippings and other debris collected in the bag 23 and thereby also to avoid unwanted disconnection of the collection bag 23 from the sleeve or cylindrical housing 25, there is provided a platform 41 which extends rearwardly from the rotary blade housing 15 and which is adapted to support the bottom of the collection bag 23. More specifically, the forward end of the platform 41 can include one or more ears or tabs 43 received in suitable openings in the rearward portion of the top deck 45 of the rotary blade housing 15. The rearward portion of the platform 41 can be connected by a tie rod or other support 47 to the handle structure 21. If desired, the platform 41 can be upwardly concave and can be provided, on its underside, with a suitable skid or caster wheel 49.

Extending between the discharge chute 19 and the sleeve or cylindrical housing 25 is a duct or grass clipping passage 51 which is preferably constructed of air impervious material, which desirably includes a flexible portion, which is detachably connected to the discharge chute 19, and which communicates with and extends tangentially from the sleeve or cylindrical housing 25, preferably from adjacent the top thereof. The duct 51 can be of any suitable construction. In the illustrated construction, the duct or passage 51 includes a discharge portion 53 which extends tangentially from the sleeve or housing 25, and which constitutes an inlet into the sleeve or housing 25 for the clippings and air discharged from the duct 51, together with a flexible central portion 55, and a connecting portion 57 which can conveniently be metallic and which is adapted for releasable connection to the discharge chute 19 of the rotary lawn mower 13.

In operation, rotation of the blade (not shown) in the blade housing 15 creates sufficient air movement to convey grass clippings and other debris upwardly out of the discharge chute 19 and through the passage or duct 51 into the sleeve or cylindrical housing 25. Because of the tangential relationship between the discharge portion 53 of the passage or duct 51 and the sleeve or cylindrical housing 25, the entering grass-clipping-laden-air initially swirls around the cylindrical housing 25 in a centrifugal action whereby the clippings are thrown outwardly and then gradual lose velocity. As a result, clippings and debris settle into the attached disposable collection bag 23. The air in the center, therefore, becomes free of clippings and exits from the sleeve or cylindrical housing 25 through the screened exiting air hood 33. The rotatability of the hood 33 permits angular adjustment so as to avoid directing the exiting air stream in such manner as to blow on the operator.

When the collection bag 23 is full, the garter spring 35 can be released to permit disconnection of the bag 23 from the bottom of the sleeve or cylindrical housing 25 and to thereafter permit attachment to the housing 25 of another empty collection bag 23.

Shown in FIGS. 3 and 4 is another grass clipping attachment or apparatus 111 which incorporates various of the features of the invention and which is particularly arranged to be towed behind a riding lawn mower 113 having a side discharge outlet 119.

The apparatus or attachment 111 comprises a wheeled cart 121 which provides a platform or rest for a disposable collection bag 123 fabricated of air impervious material such as plastic. The cart 121 can be constructed in any suitable manner and preferably includes a tongue 124 adapted to be releasably connected to a towing hitch 126 at the rear of the riding mower.

Extending from the cart 121 is support frame 128 which, at the upper end thereof, is connected to a cover 131 having therein a centrally located exiting air opening 133 permitting upward exiting of air. The attachment or apparatus 111 could include a relatively rotatable hood as in the embodiment of FIGS. 1 and 2

Attached to the cover 131 is a sleeve or cylindrical housing 125 which is located so that the axis thereof is generally vertical and which includes a lower open end 132.

Telescopically attached in outwardly encircling relation to the lower open end 132 of the sleeve or cylindrical housing 125 is a disposable collection bag 123. Any suitable means, such as, for instance, a garter spring 135, can be employed to releasably retain the collection bag 123 in assembled relation to the lower open end of the sleeve or cylindrical housing 125. As before, the weight of the clippings or debris in the collection bag 123 is principally supported by the underlying cart 121.

Included in the grass collecting attachment or apparatus 111 is a grass clipping passage or duct 151 which is constructed of air impervious material. The duct 151 includes a discharge portion 153, a flexible portion 155, and an inlet or connecting portion 157 adapted to be releasably connected or attached to the discharge outlet 119 of the riding lawn mower 113. Because of the distance between the discharge outlet 119 of the riding lawn mower 113 and the sleeve or housing 125 and because of the height above the ground of the sleeve or cylindrical housing 125, the passage or duct 151 includes means for assisting in delivering the grass-clipping-laden air from the riding lawn mower 113 to the sleeve or cylindrical housing 125. While various means can be employed to assist in delivering the clippings in a stream of air to the sleeve or cylindrical housing 125, in the illustrated construction, such means comprises a centrifugal blower 171 which is mounted on the cart 121 and driven by suitable means (not shown), as for instance, either by a power take-off from the riding lawn mower 113 or by an independent gasoline engine mounted on the cart 121.

The flexible portion 155 of the grass clipping passage or duct 151 is connected to an axial inlet 173 in the blower 171. Preferably, the inlet 173 is provided with a sliding damper 174 which can be used to close the inlet 173 when changing bags. A similar device could be used on the outlet if desired. If a damper is not used, the air pressure from the running blower makes attaching the bag very difficult, and otherwise the blower must be shut off while attaching the bag. The blower 171 is also constructed to include a tangential outlet 175 connected to a sheet metal duct portion 177 which merges into the discharge portion 153 extending tangentially from the cylindrical housing 125. Thus, the duct work also serves to support the cylindrical housing 125. Of course, any suitable means can be provided to support the cylindrical housing 125.

Due to the provision of the blower 171 in the grass clipping duct or passage 151, the inlet of the duct or passage 151 can be employed as a vacuum for leaves and debris independently of the mower when the inlet or connecting portion 157 is disconnected from the discharge outlet 119 of the riding lawn mower 113. It will be observed that, as in the embodiment of FIG. 1, the grass clipping duct or passages are constructed generally of air impervious material so as to avoid loss of air and to deliver substantially all of the air from the discharge outlet or chute to the sleeve or cylindrical housing 125. In the sleeve or cylindrical housing 125, the grass clipping-laden-air entering the housing 125 initially swirls and then loses velocity. As a consequence, the clippings fall from the air stream into the disposable collection bag 123 and the air exits through the opening 133 in the cover 131.

The apparatus disclosed herein can be constructed in the form of an attachment to an existing lawn mower of the handle-guided type or of the riding type, or can be constructed as a unitary part of an overall lawn mowing device.

In this last regard, there is shown in FIG. 5 a riding lawn mower 201 which includes a frame 212 and which has mounted thereon a grass clipping collection apparatus 211 in accordance with the invention. AS distinguished from the construction shown in FIGS. 3 and 4, the grass collecting apparatus 211 is suitably mounted on a frame or support 227 which is mounted on and extends from the frame 212 of the riding lawn mower 201 and which can be independent of any other support from the ground. The connection supporting the frame 227 and the connection thereof to the riding lawn mower frame 212 can be executed in any convenient manner.

The embodiment shown in FIG. 5 also differs from the construction shown in FIGS. 3 and 4 by employing a duct 51 and a housing 25 which are constructed as generally shown in the embodiment illustrated in FIGS. 1 and 2. In this last regard, various of the numerals employed in the construction shown in FIGS. 1 and 2 have been applied to comparable components in the construction shown in FIG. 5.

Shown in FIGS. 6 through 9 is a housing 325 which is particularly adapted for releasable attachment thereto of a plurality of collection bags 323. The housing 325 can be employed in any of the embodiments previously disclosed herein, and is generally cylindrical in overall shape. Extending tangentially from the housing 325 is a duct portion 353 through which grass clippings are discharged into the housing 325. The housing 325 also includes a cover or top portion 331 which is centrally apertured to provide an exiting air opening 333 which is preferably larger in size than the size of the duct portion 353 which constitutes the inlet into the housing 325. In addition, the exiting air opening 333 is provided with a screen 334 which prevents grass clipping escape and which extends downwardly into the housing so as to provide a large flow area offering little restriction to exitinng air flow.

The bottom or lower portion of the housing 325 is formed to provide two openings 326 which are each adapted for attachment thereto of a separate grass clipping collection bag 323. As already indicated, suitable garter springs 335 can be employed to releasably retain the bags 323 on the housing 325. In addition to supporting the bags 323 from the lower part of the housing 325, the bags can be additionally supported by a cart or platform 341 supported from the ground, or extending from the lawn mower, or by any combination of a lawn mower support and ground support.

Of course, the duct portion 353 connected to the housing is adapted to be connected to a duct as shown in the embodiment of FIGS. 1 and 2 and in the embodiment of FIGS. 3 and 4, for passage therethrough of grass clippings or other debris from a lawn mower, as already explained.

Various of the features of the invention are set forth in the following claims.

What is claimed is:

1. A rotary lawn mower including a blade housing including a discharge outlet, a cylindrical housing having an upper end and a lower end, means supporting said cylindrical housing relative to said blade housing with the axis of said cylindrical housing extending generally vertically, a cover closing said upper end of said cylindrical housing and including therein an exiting air opening communicating with the atmosphere, a grass clipping passage communicating with and extending tangentially from said cylindrical housing and communicating with said discharge outlet for delivering clippings to said cylindrical housing from said blade housing for initial swirling movement in said cylindrical housing and for separation of the clippings from the air, a receptacle connected to said lower end of said cylindrical housing for receiving clippings therefrom, and a rotary cutter blade in said blade housing for grass cutting and for delivering a stream of air and grass clippings through said discharge outlet and into said grass clipping passage.

2. A rotary lawn mower in accordance with claim 1 wherein said cover comprises an exiting air hood rotatable relative to said cylindrical housing.

3. A rotary lawn mower in accordance with claim 1 wherein said receptacle comprises a disposable bag removably attached to said lower housing end.

4. A rotary lawn mower in accordance with claim 1 and further including a blower located in said passage for assisting in delivering clippings from said blade housing to said cylindrical housing.

5. A rotary lawn mower in accordance with claim 1 wherein said passage includes a flexible portion and an inlet portion connected to said flexible portion and adapted for releaseable connection with said discharge outlet and adapted, when disconnected from said discharge outlet, to be employed independently of said blade housing for vacuuming debris.

6. A rotary lawn mower in accordance with claim 1 and further including means for supporting said cylindrical housing for travel over the ground independently of said blade housing.

7. A rotary lawn mower in accordance with claim 1 wherein said means supporting said cylindrical housing comprises a handle extending from said blade housing.

8. A rotary lawn mower in accordance with claim 1 and further including means for supporting the weight of said receptacle and of said cylindrical housing independently of said blade housing.

* * * * *